United States Patent Office 3,503,192
Patented Mar. 31, 1970

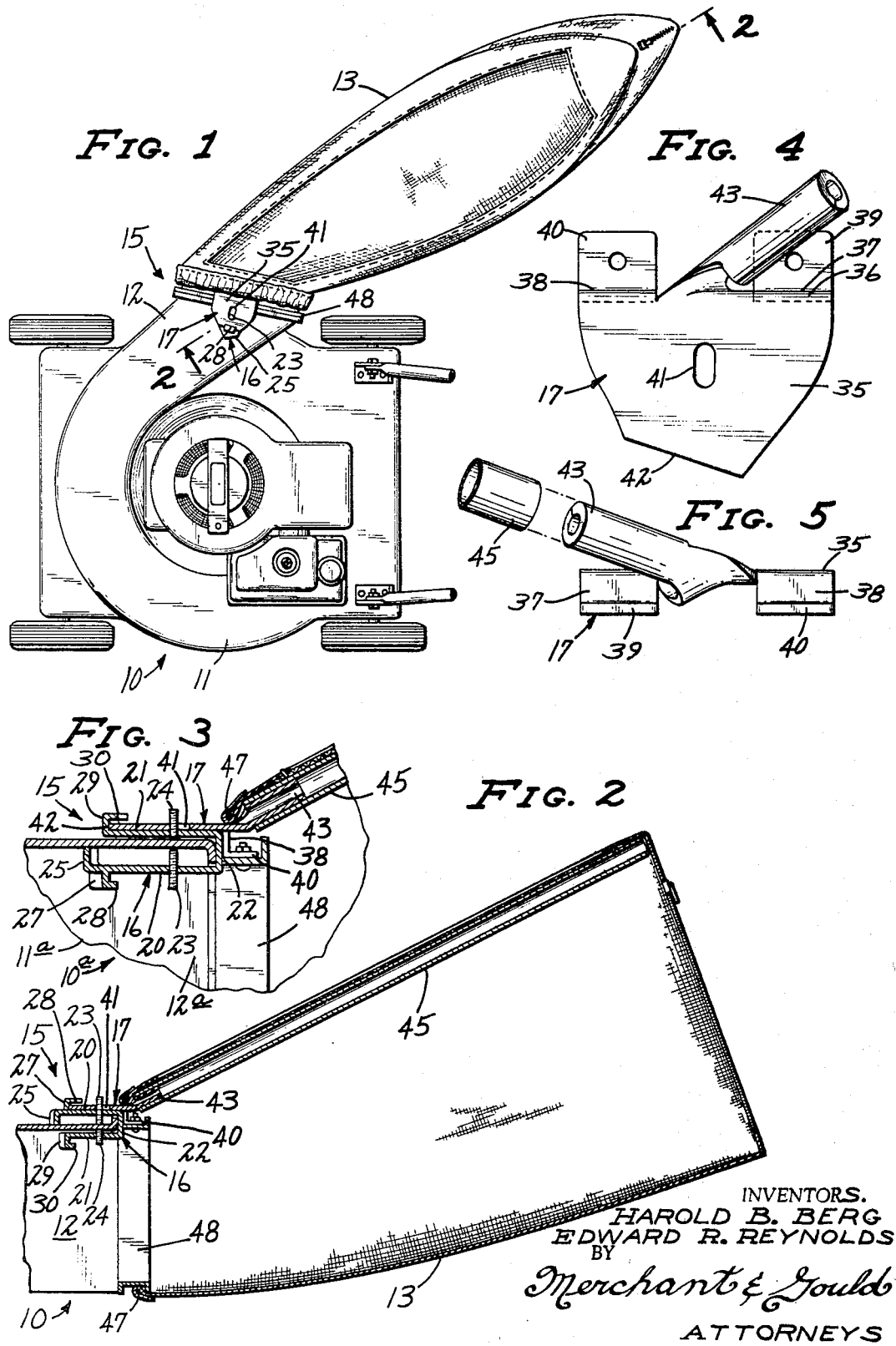

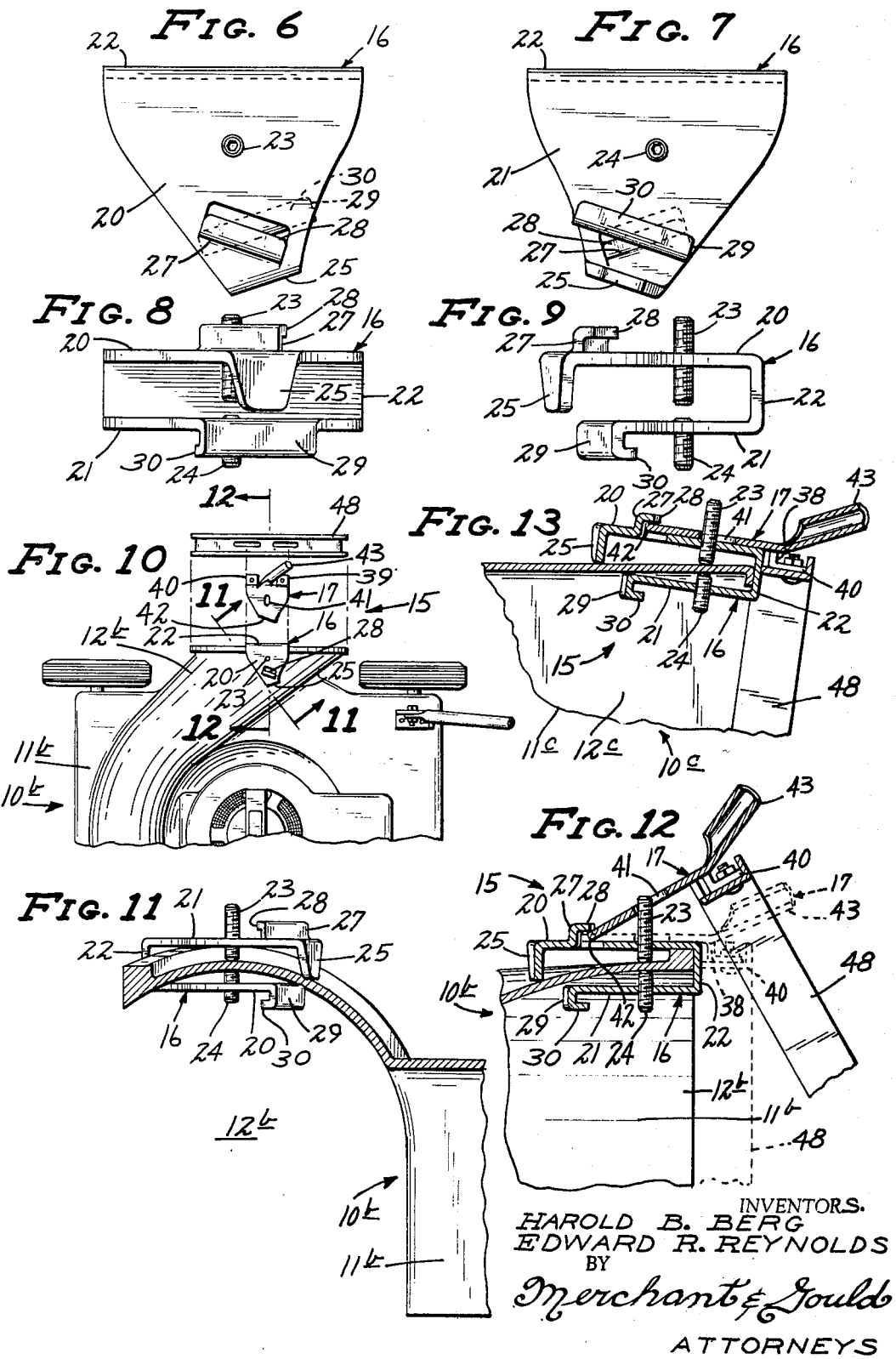

3,503,192
ATTACHMENT APPARATUS
Harold B. Berg, 1110 Welcome Circle, Golden Valley, Minneapolis, Minn. 55422, and Edward R. Reynolds, St. Paul, Minn.; said Reynolds assignor to said Berg
Filed Oct. 11, 1967, Ser. No. 674,429
Int. Cl. A01d 35/22
U.S. Cl. 56—202                                8 Claims

ABSTRACT OF THE DISCLOSURE

A first member having a generally U-shaped cross section reversibly mounted on the upper wall of the discharge outlet of a mower by means of upper and lower centrally located set screws. Upper and lower lip-like stops cooperating with the set screws to removably receive a second member in overlying relationship on the first member, in either position, and maintain the second member rigidily in position relative to the outlet. A grass bag attaching frame affixed to the second member to position the opening of a grass bag over the outlet.

BACKGROUND OF THE INVENTION

Field of the invention

In rotary mowers of the type utilized on lawns and the like, it is the present practice to catch the grass clippings as they leave the mower and to dispose of the clippings so that the lawn is not damaged through accumulation thereof. In general, these clippings are caught and retained in a bag removably attached to the mower and engaged over the outlet thereof. In many instances the bags have frames, adapted to fit the discharge outlet of the mower, fixedly engaged thereto and the entire assembly is adapted to be positioned adjacent the discharge opening so that the frame is butting against the discharge opening and the bag is in communication therewith. In general, this entire assembly must be easily removable from the mower so that the bag can be quickly and easily emptied when required.

Description of the prior art

In prior art devices, clamps and the like are utilized, each of which is specifically made for a certain model of mower. Relatively few of these clamps are attachable to any mower other than the one for which they are specifically made. Thus, if an operator wishes to exchange his particular type of mower, he must also obtain new grass catching apparatus designed for that type of mower. In some prior art devices, clamps or the like are provided which can be attached to any mower with certain modifications of the mower. In general, these prior art devices require holes in the mower so they can be bolted thereto.

SUMMARY OF THE INVENTION

The present invention includes a first member constructed so that it can be fixedly attached adjacent the discharge outlet of substantially any mower, and a second member adapted to be removably engaged with said first member and having grass catching apparatus, such as a grass retaining bag or the like, attached thereto and positioned so as to be in communication with the discharge outlet of the mower when the second member is engaged with the first member.

It is an object of the present invention to provide new and improved attachment apparatus for removably attaching grass catching apparatus adjacent the discharge opening in the housing of a rotary mower.

It is a further object of the present invention to provide attachment apparatus which can be fixedly attached to substantially any rotary mower.

It is a further object of the present invention to provide attachment apparatus which is simple to attach to a rotary mower and which requires no modification of the mower, but which can be attached to a modified mower if desired.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIGURE 1 is a view in top plan of a mower having the present attachment apparatus affixed thereto;

FIGURE 2 is an enlarged sectional view as seen from the line 2—2 in FIGURE 1;

FIGURE 3 is an enlarged view in detail, similar to FIGURE 2, illustrating the attachment apparatus in an alternate position for a different style of mower;

FIGURE 4 is a view in top plan of a removable member of the attachment apparatus;

FIGURE 5 is a view of the member illustrated in FIGURE 4 as seen from the top in FIGURE 4;

FIGURE 6 is a view in top plan of a fixed member of the attachment apparatus;

FIGURE 7 is a view in bottom plan of the fixed member illustrated in FIGURE 6;

FIGURE 8 is a side view of the member illustrated in FIGURE 6 as seen from the front thereof;

FIGURE 9 is a side view of the member illustrated in FIGURE 6 as seen from the right side thereof.

FIGURE 10 is an exploded view in top plan of a mower having the member illustrated in FIGURE 6, the member illustrated in FIGURE 4 and an adjustable frame attacehd thereto in a first position;

FIGURE 11 is an enlarged sectional view as seen from the line 11—11 in FIGURE 10;

FIGURE 12 is an enlarged sectional view as seen from the line 12—12 in FIGURE 10, illustrating the manner in which the removable member and frame are engaged on the fixed member; and FIGURE 13 is a view similar to FIGURE 3 illustrating another position of the attachment apparatus for a different style of mower.

DESCRIPTION OF THE PREFERRED EMBODIMENT

In FIGURES 1 and 2, the numeral 10 generally designates a rotary mower having a housing 11 with a discharge outlet 13 therein. A grass retaining bag 13 is removably attached to the housing 11 in communication with the discharge outlet 12 by attachment apparatus, generally designated 15. The attachment apparatus 15 includes a fixedly attached, first member 16, illustrated in detail in FIGURE 6 through 9, and a removably engaged, second member 17, illustrated in detail in FIGURES 4 and 5. It should be understood that the illustrated embodiments of the members 16 and 17 are preferred, but one skilled in the art might modify these embodiments in a variety of ways, all of which are intended to come within the scope of this invention.

The fixedly attachment member 16 includes first and second relatively flat portions 20 and 21, respectively, positioned substantially parallel and spaced apart by a third portion 22 extending therebetween along an edge thereof. In this embodiment, the portions 20, 21, and 22 are all integrally formed with the portion 22 extending outwardly from either of the portions 20 and 21 to produce a generally U-shaped cross section. Each of the portions 20 and 21 has a set screw 23 and 24, respectively, threadedly engaged therethrough approximately centrally and perpendicular to the plane of the portions 20 and 21. The set screws 23 and 24 are spaced from the portion 22 a distance sufficient to hold the member 16 rigid with respect to the housing 11. A foot 25 extends inwardly from the portion 20 in the general direction of the portion 21 and provides an additional surface of the member 16 to bear against the housing 11 and hold the member 16 rigid with respect thereto. Thus, when the member 16 is placed on a housing 11, the portion 22 is in abutting engagement with the lip of the discharge outlet 12, the foot 25 bears against the surface of the housing 11, and the set screws 23 and 24 are tightened into engagement with the upper and lower surfaces of the housing 11 to hold the member 16 in the desired position. A number of surfaces (portion 22, set screws 23 and 24, foot 25, and in some instances either portion 20 or 21) are provided on the member 16 all or at least some of which always bear against the housing of substantially any rotary mower to insure a rigid attachment of the member 16 to the housing, as for example the attachment of the member 16 to the housing 11.

The member 16 has a first stop means 27 attached to the portion 20 thereof consisting of a part extending outwardly generally perpendicular to the upper surface thereof with the end portion turned toward the set screw 23 (which operates as a second stop means as will be apparent presently) substantially parallel with the portion 20 of the member 16, but spaced therefrom to form a lip 28. The stop means 27 may be a separate piece of material fixedly attached to the portion 20 by welding or the like, or it may be part of the portion 20 stamped and bent into the desired configuration. The stop means 27 is spaced from the set screw 23 generally away from the portion 22, for purposes which will become apparent presently. The particular position of the stop means 27 is such that the lip 28 extends generally rearwardly and outwardly relative to the mower 10 when the portion 22 of the member 16 is butting against the lip of the discharge outlet 12. A third stop member 29 similar to the stop means 27, having a lip 30 similar to the lip 28, is attached to the portion 21 and positioned relative to the portion 22 and set screw 24 (which operates as a fourth stop means) in a fashion similar to the positioning of the stop means 27 relative to the portion 22 and the set screw 23. In this embodiment the stop means 29 is formed simply by bending the outermost edge of the portion 21 into the desired shape. It should be understood, however, that the stop means 29 might be constructed in any of the various ways described for the stop means 27, and the configuration of either of the stop means 27 or 29 might vary considerably from that shown and still come within the scope of this invention.

In some instances it might be desirable to construct the member 16 with only the portion 22 and either the portion 20 of the portion 21 and the associated stop means 27 or 29, respectively. In this instance the set screw 23 or 24 is replaced by a bolt which extends upwardly through a hole in the housing 11 and through the portion 20 or 21 a substantial distance to operate as a second stop means. It is fully intended that such a modification come within the scope of this invention.

The removably engaged member 17 of the attachment apparatus 15 has a substantially flat portion 35 adapted to overlie the portion 20 or the portion 21 of the fixedly attached member 16. In this embodiment the material making up the member 17 is bent at approximately right angles to the portion 35 along an edge 36 of the portion 35 in two spaced apart positions. Thus, two parallel portions 37 and 38 lying substantially in a single plane perpendicular to the plane of the portion 35 are formed. Both of the portions 37 and 38 are again bent adjacent the outermost edge to form two feet 39 and 40, which lie substantially parallel with the plane of the portion 35, but extend outwardly from the portions 37 and 38, respectively, in the opposite direction. Each of the feet 39 and 40 has a mounting hole formed therein. An opening 41 is formed in the portion 35 of the member 17 so that either of the set screws 23 or 24 is engaged therein when the portion 35 of the member 17 is overlying either of the portions 20 or 21, respectively, and the portions 37 and 38 of the member 17 are butted against the portion 22. The portion 35 has an edge 42 in opposed relationship to the edge 36 and forming an angle therewith substantially equal to the angle formed between either of the stop means 27 or 29 and the portion 22 of the member 16. The position of the opening 41 relative to the edge 42 of the member 17 is such that when the edge 42 is engaged beneath the lip 28 of the stop means 27 or the lip 30 of the stop means 29, as illustrated in FIGURE 12, the member 17 can be moved vertically so that the opening 41 can be engaged over either the set screw 23 or the set screw 24, respectively.

The material making up the member 17 between the portion 37 and the portion 38 is bent upwardly with respect thereto with the outermost portions formed into a cylinder 43. The cylinder 43 is directed generally outwardly and rearwardly with respect to the mower 10 when the members 16 and 17 are correctly positioned on the housing 11 thereof. A hollow tubular rod 45 is engaged coaxially over the cylinder 43 and extends outwardly therefrom to form a support for the grass retaining bag 13. In the present embodiment the bag 13 has a mouth with an elastic band 47 attached therearound. A generally rectangularly shaped frame 48 having an inner opening therethrough substantially equal in dimensions to the discharge outlet 12 of the mower 10, is affixed to the feet 39 and 40 so as to extend downwardly therefrom. The bag 13 is placed over the rod 45 and the elastic band 47 holds the bag 13 in engagement with the frame 48. To place the assembly on the mower 10, the portion 35 of the member 17 is placed at an angle above the portion 20, as illustrated in FIGURE 12, and the edge 42 is engaged beneath the lip 28 of the stop means 27. The member 17 is then moved vertically downwardly so that the set screw 23 is engaged in the opening 41 and the portion 35 of the member 17 overlies the portion 20 of the member 16. It should be noted that the set screw 23 extends a substantial distance above the upper surface of the portion 20 and the upper portion thereof operates as a stop means which cooperates with the stop means 27 to engage the member 17 and prevent horizontal movement thereof. In this position the frame 48 is adjacent the discharge outlet 12 and the bag 13 is in communication with the discharge outlet 12. When the bag 13 is filled with grass clippings, it may be removed by simply reversing the procedure just outlined.

FIGURE 3 illustrates a different embodiment of a discharge outlet, designated 12a, in a housing 11a of a rotary mower 10a (not shown). The various parts and members of the attachment apparatus 15 are designated with the same numbers as those utilized in the embodiment illustrated in FIGURES 1 and 2 so that the alternate position of the fixedly attached member 16 can be appreciated. In FIGURE 3, the type of mower 10a has an inwardly extending lip or flange around the discharge outlet 12a. To mount the fixedly attached member 16 to the housing 11a, the portion 20 is placed in underlying relationship to the housing 11a and the portion 21 is placed in overlying relationship thereto. In this position, the foot 25 bears against the inner surface of the housing 11a and the set screw 23 is adjusted to maintain the portions 20 and 21 substantially horizontal. The upper set screw 24 may bear against the upper surface of the housing 11a, or the under surface of the portion 21 may bear against the upper surface of the housing 11a to hold the member 16 fixedly in place. In this instance the set screw 24 extends outwardly above the portion 21 sufficiently to form a stop means which cooperates with the stop means 29 to engage the member 17 and prevent horizontal movement thereof.

FIGURES 10 through 12 illustrate a mower generally designated 10b having a housing 11b with a generally semicircular grass clipping chute and discharge outlet 12b. Again, the attachment apparatus 15 and all of its various parts and members are designated with the same numbers as utilized in the FIGURES 1 and 2 so that the attachment of the apparatus to a semicircular type discharge outlet 12b can be fully appreciated. For the discharge outlet 12b, the portion 20 is placed in overlying relationship to the housing 11b and the portion 21 is placed in underlying relationship thereto. With the portion 22 in abutting engagement with the lip of the discharge outlet 12b, the member 16 is formed so that the foot 25 is displaced from the uppermost portion of the radius of the discharge outlet 12b, while the set screw 23 is approximately at the center thereof. Referring to FIGURE 11, it can be seen that the portion 21 bears against the inner surface of the housing 11b at two points, while the foot 25 and the set screw 23 bear against the upper surface of the housing 11b. Thus, the fixedly attached member 16 is rigidly affixed to the housing 11b.

In FIGURE 13, a fourth type of rotary mower 10c is illustrated having a discharge outlet 12c which is canted slightly toward the ground. For the mower 10c having the type of discharge outlet 12c, the fixedly attached member 16 is adjusted, through adjustment of the set screws 23 and 24, so that the portions 20 and 21 are canted relative to the mower 10c but substantially perpendicular to the plane of the discharge outlet 12c. Thus, the frame 48 is maintained tightly adjacent the discharge outlet 12c. It should be understood that many varieties of mowers are produced which have not been illustrated in the figures, and which vary somewhat from the types disclosed herein. Because of the adjustability provided in the fixedly attached member 16 through the set screws 23 and 24, and because of the various surfaces adapted to bear against the housing of the mower, the member 16 can be fixedly attached to substantially any of these various types of mowers. Further, because a number of surfaces of the member 16 bear against the mower housing simultaneously, there is substantially no danger of horizontal or rotary movement of the attachment apparatus.

What is claimed is:

1. Attachment apparatus for removably attaching grass catching apparatus adjacent the discharge opening in the housing of a rotary mower comprising:
   (a) a first member having an outwardly extending portion fixedly connected thereto;
   (b) means for fixedly attaching said first member to the housing of a rotary mower with a portion of said first member overlying a portion of the housing and said outwardly extending portion butting against the lip of the discharge opening, said outwardly extending portion limiting horizontal movement and substantially preventing rotary movement of said first member;
   (c) first and second stop means being fixedly attached to said first member in spaced apart relationship and extending thereabove generally away from the housing;
   (d) a second member being positioned in overlying relationship to at least a portion of said first member and removably engaging said first and second stop means, said first stop means substantially preventing vertical movement of a portion of said second member positioned away from the discharge opening while allowing limited horizontal movement thereof and said second stop means cooperating with said first stop means to substantially prevent horizontal movement of said second member relative to said first member while allowing limited vertical movement of a portion thereof adjacent the discharge opening; and
   (e) means for fixedly attaching grass catching apparatus to said second member whereby said grass catching apparatus is removably attached to said first member and the mower housing.

2. Attachment apparatus as set forth in claim 1 wherein the first stop means includes a portion extending upwardly above the upper surface of the first member and a portion extending from said upwardly extending portion generally toward the discharge opening in a spaced apart relationship to the upper surface of the first member and the second stop means includes a generally upright cylindrical member.

3. Attachment apparatus as set forth in claim 2 wherein the second stop means includes a portion of a screw threadedly engaged in the first member, said screw further forming at least a part of the means for fixedly attaching said first member to the housing of the mower.

4. Attachment apparatus as set forth in claim 1 wherein the first member includes a portion attached to the outwardly extending portion and positioned in a substantially parallel spaced apart relationship from the portion of the first member overlying a portion of the housing so as to be in underlying relationship to substantially said portion of the housing.

5. Attachment apparatus as set forth in claim 4 wherein the overlying portion of the first member has a downwardly extending foot portion attached thereto for butting against the surface of the housing and maintaining the overlying portion of the first member spaced from the housing.

6. Attachment apparatus as set forth in claim 4 wherein the underlying portion of the first member has first and second stop means attached thereto similar to the first and second stop means attached to the overlying portion of the first member.

7. Attachment apparatus for removably attaching grass catching apparatus adjacent the discharge opening in the housing of a rotary mower comprising:
   (a) a first portion;
   (b) a second portion being fixedly connected to said first portion by an outwardly extending portion in a generally parallel spaced apart relationship;
   (c) first and second stop means being fixedly attached to said first portion in spaced apart relationship and extending thereabove generally away from said second portion, said first and second stop means being adapted to removably engage grass catching apparatus and maintain the grass catching apparatus adjacent the discharge opening of a mower;
   (d) third and fourth stop means being fixedly attached to said second portion in spaced apart relationship and extending thereabove generally away from said first portion, said third and fourth stop means being adapted to removably engage grass catching apparatus and maintain the grass catching apparatus adjacent the discharge opening of a mower;
   (e) a downwardly extending foot portion attached to said first portion for butting against the surface of the housing and maintaining said first portion spaced from the housing; and
   (f) means for fixedly attaching said attachment apparatus to a mower housing with said outwardly extending portion butting against the lip of the discharge opening and one of said first and second portions positioned in overlying relationship to a portion of the housing and the other of said first and second portions positioned in underlying relationship to substantially the portion of the housing.

8. Attachment apparatus as set forth in claim 7 wherein the second and fourth stop means each include portions of screws threadedly engaged in the first and second portions, respectively, said screws further forming at least a part of the means for fixedly attaching said attachment apparatus to a mower housing.

References Cited

UNITED STATES PATENTS

| | | | |
|---|---|---|---|
| 1,815,353 | 7/1931 | Gerow et al. | 248—42 |
| 2,174,140 | 9/1939 | Schofield | 248—42 |
| 3,213,600 | 10/1965 | Anderson | 56—202 |

ANTONIO F. GUIDA, Primary Examiner

GREGORY E. McNEILL, Assistant Examiner